United States Patent
Li et al.

(10) Patent No.: US 9,241,273 B2
(45) Date of Patent: Jan. 19, 2016

(54) METHODS, APPARATUSES AND COMPUTER PROGRAM PRODUCTS FOR CONFIGURATION OF SIGNALING RADIO BEARERS

(71) Applicant: Nokia Technologies Oy, Espoo (FI)

(72) Inventors: Haitao Li, Beijing (CN); Yang Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/913,729

(22) Filed: Jun. 10, 2013

(65) Prior Publication Data

US 2013/0329715 A1     Dec. 12, 2013

(30) Foreign Application Priority Data

Jun. 12, 2012    (WO) ................ PCT/CN2012/076765

(51) Int. Cl.
*H04W 16/02*       (2009.01)
*H04W 28/18*       (2009.01)
(Continued)

(52) U.S. Cl.
CPC ............... *H04W 16/02* (2013.01); *H04W 28/18* (2013.01); *H04W 16/04* (2013.01); *H04W 16/32* (2013.01)

(58) Field of Classification Search
CPC ..... H04W 16/02; H04W 28/18; H04W 16/04; H04W 16/32
USPC .......................................... 370/338, 328, 331
See application file for complete search history.

(56) References Cited

U.S. PATENT DOCUMENTS

| | | | | |
|---|---|---|---|---|
| 7,230,937 | B2 * | 6/2007 | Chi et al. ........................ | 370/329 |
| 8,401,068 | B2 * | 3/2013 | Ulupinar et al. ............... | 375/240 |
| 8,599,784 | B2 * | 12/2013 | Lim et al. ....................... | 370/329 |

(Continued)

FOREIGN PATENT DOCUMENTS

| | | |
|---|---|---|
| CN | 101370251 A | 2/2009 |
| WO | 2011/119680 A2 | 9/2011 |

(Continued)

OTHER PUBLICATIONS

Extended European Search Report received for corresponding European Patent Application No. 13170798.6, dated Sep. 9, 2014, 6 pages.

(Continued)

*Primary Examiner* — Mohammad Anwar
(74) *Attorney, Agent, or Firm* — Alston & Bird LLP (57) ABSTRACT

Methods, corresponding apparatuses, and computer program products for configuring one or more signaling radio bearers are disclosed. A method comprises sending a configuration request for configuring one or more signaling radio bearers to a local area access point by which a user equipment is connected to a wide area base station, wherein the one or more signaling radio bearers are used for communication between the user equipment and the wide area base station. The method also comprises receiving configuration information with respect to the one or more signaling radio bearers from the local area access point. The method additionally comprises sending the configuration information with respect to the one or more signaling radio bearers to the user equipment via a radio resource control message. With the claimed inventions, the wide area base station is capable of efficiently configuring the signaling radio bearers for use between the wide area base station and the user equipment via the local area access point.

18 Claims, 6 Drawing Sheets

(51) Int. Cl.
*H04W 16/04* (2009.01)
*H04W 16/32* (2009.01)

(56) References Cited

U.S. PATENT DOCUMENTS

| | | |
|---|---|---|
| 2008/0285492 A1 | 11/2008 | Vesterinen |
| 2010/0048216 A1 | 2/2010 | Sundarraman et al. |
| 2010/0202391 A1* | 8/2010 | Palanki et al. ............... 370/329 |
| 2011/0141971 A1 | 6/2011 | Zhang et al. |
| 2011/0194533 A1 | 8/2011 | Chen |
| 2011/0292896 A1 | 12/2011 | Yeuom et al. |
| 2012/0106495 A1* | 5/2012 | Yang et al. ................... 370/329 |

FOREIGN PATENT DOCUMENTS

| | | |
|---|---|---|
| WO | 2011/121580 A2 | 10/2011 |
| WO | 2011/157129 A2 | 12/2011 |
| WO | 2013/123643 A1 | 8/2013 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 9)", 3GPP TS 36.413, V9.8.0, Dec. 2011, pp. 1-243.

"3rd Generation Partnership Project; Technical Specification Group Radio Access Network; Evolved Universal Terrestrial Radio Access (E-UTRA); Radio Resource Control (RRC); Protocol Specification (Release 9)", 3GPP TS 36.331, V9.10.0, Mar. 2012, pp. 1-255.

Dornal, "LTE Whitepaper", Initial Draft, Version 1.0, Oct. 8, 2009, pp. 1-26.

International Search Report and Written Opinion received for corresponding Patent Cooperation Treaty Application No. PCT/CN2012/076765, dated Mar. 21, 2013, 12 pages.

* cited by examiner

METHODS, APPARATUSES AND COMPUTER PROGRAM PRODUCTS FOR CONFIGURATION OF SIGNALING RADIO BEARERS

FIELD OF THE INVENTION

Embodiments of the present invention generally relate to wireless communication techniques including the 3GPP (the 3rd Generation Partnership Project) LTE (Long Term Evolution) technique. More particularly, embodiments of the present invention relate to methods, apparatuses, and computer program products for configuring one or more signaling radio bearers in a heterogeneous network including a wide area system (e.g., an LTE system) and a local area system.

BACKGROUND OF THE INVENTION

Various abbreviations that appear in the specification and/or in the drawing figures are defined as below:
AM Acknowledged Mode
AP Access Point
BS Base Station
CCCH Common Control Channel
CN Core Network
C/I Cipher/Integrity protection
CP Control Plane
DCCH Dedicated Control Channel
DRB Data Radio Bearer
EAP Extensible Authentication Protocol
eNB evolved Node B
EPS Enhanced Packet System
EPC Enhanced Packet Core
GW Gateway
HLR Home Location Register
HSS Home Subscriber Server
IP Internet Protocol
LAN Local Area Network
LCP Logical Channel Prioritization
MAC Medium Access Control
MME Mobility Management Entity
MSC Mobile Switching Centre
NAS Non Access Stratum
OAM Operations, Administrations and Maintenance
PDCP Packet Data Convergence Protocol
PDU Protocol Data Unit
RB Radio Bearer
RLC Radio Link Control
RRC Radio Resource Control
RRM Radio Resource Management
S1AP Application Protocol over S1 interface
SRB Signaling Radio Bearer
SDU Service Data Unit
UE User Equipment
VLR Visitor Location Register
WAN Wide Area Network The following description of background art may include insights, discoveries, understandings or disclosures, or associations together with disclosures not known to the relevant art prior to the present invention but provided by the present invention. Some such contributions of the present invention may be specifically pointed out below, while other such contributions of the present invention will be apparent from their context.

With the rapid developments of an LTE system, a high-speed data service is of increasing importance to meeting the requirements of wireless communication users. It is known that a LAN system generally provides a relatively high speed data service. Therefore, how to provide a local service with a high speed data rate under a wireless communication system, e.g., an LTE system, has become a hot topic in the 3GPP.

SUMMARY OF THE INVENTION

The following presents a simplified summary of the present invention in order to provide a basic understanding of some aspects of the present invention. It should be noted that this summary is not an extensive overview of the present invention and that it is not intended to identify key/critical elements of the present invention or to delineate the scope of the present invention. Its sole purpose is to present some concepts of the present invention in a simplified form as a prelude to the more detailed description that is presented later.

One embodiment of the present invention provides a method. The method comprises sending a configuration request for configuring one or more SRBs to a local area AP by which a UE is connected to a wide area BS, wherein the one or more SRBs are used for communication between the UE and the wide area BS. The method further comprises receiving configuration information with respect to the one or more SRBs from the local area AP. The method additionally comprises sending the configuration information with respect to the one or more SRBs to the UE via an RRC message.

In one embodiment, the configuration request includes configuration information recommended by the wide area BS with respect to the one or more SRBs.

In another embodiment, the configuration information includes RLC layer configuration information and logical channel configuration information with respect to the one or more SRBs.

In yet another embodiment, the method comprises receiving from the UE a response message indicative of successful configuration of the one or more SRBs at the UE.

Another embodiment of the present invention provides a method. The method comprises receiving a configuration request for configuring one or more SRBs from a wide area BS, wherein the one or more SRBs are used for communication between the UE and the wide area BS via a local area AP. The method also comprises sending configuration information with respect to the one or more SRBs to the wide area BS for configuring the one or more SRBs between the wide area BS and the UE.

In one embodiment, the configuration request includes recommended configuration information with respect to the one or more SRBs and the method further comprises determining the configuration information with respect to the one or more SRBs based upon configuration information with respect to all the RBs at the local area AP and the recommended configuration information.

One embodiment of the present invention provides an apparatus. The apparatus comprises means for sending a configuration request for configuring one or more SRBs to a local area AP by which a UE is connected to a wide area BS, wherein the one or more SRBs are used for communication between the UE and the wide area BS. The apparatus also comprises means for receiving configuration information with respect to the one or more signaling radio bearers from the local area access point. The apparatus further comprises means for sending the configuration information with respect to the one or more SRBs to the UE via an RRC message.

Another embodiment of the present invention provides an apparatus. The apparatus comprises means for receiving a configuration request for configuring one or more SRBs from a wide area BS, wherein the one or more SRBs are used for communication between the UE and the wide area BS via a local area AP. The apparatus also comprises means for sending configuration information with respect to the one or more SRBs to the wide area BS for configuring the one or more SRBs between the wide area BS and the UE.

A further embodiment of the present invention provides an apparatus. The apparatus comprises at least one processor and at least one memory including computer program instructions. The at least one memory and computer program instructions are configured to, with the at least one processor, cause the apparatus at least to send a configuration request for configuring one or more SRBs to a local area AP by which a UE is connected to a wide area BS, wherein the one or more SRBs are used for communication between the UE and the wide area BS. The at least one memory and computer program instructions are also configured to, with the at least one processor, cause the apparatus at least to receive configuration information with respect to the one or more SRBs from the local area AP. The at least one memory and computer program instructions are further configured to, with the at least one processor, cause the apparatus at least to send the configuration information with respect to the one or more SRBs to the UE via an RRC message.

An additional embodiment of the present invention provides an apparatus. The apparatus comprises at least one processor and at least one memory including computer program instructions. The at least one memory and computer program instructions are configured to, with the at least one processor, cause the apparatus at least to receive a configuration request for configuring one or more SRBs from a wide area BS, wherein the one or more SRBs are used for communication between the UE and the wide area BS via a local area AP. The at least one memory and computer program instructions are also configured to, with the at least one processor, cause the apparatus at least to send configuration information with respect to the one or more SRBs to the wide area BS for configuring the one or more SRBs between the wide area BS and the UE.

One embodiment of the present invention provides a computer program product, comprising at least one computer readable storage medium having a computer readable program code portion stored thereon. The computer readable program code portion comprises program code instructions for sending a configuration request for configuring one or more SRBs to a local area AP by which a UE is connected to a wide area BS, wherein the one or more SRBs are used for communication between the UE and the wide area BS. The computer readable program code portion also comprises program code instructions for receiving configuration information with respect to the one or more SRBs from the local area AP. The computer readable program code portion further comprises program code instructions for sending the configuration information with respect to the one or more SRBs to the UE via an RRC message.

Another embodiment of the present invention provides a computer program product, comprising at least one computer readable storage medium having a computer readable program code portion stored thereon. The computer readable program code portion comprises program code instructions for receiving a configuration request for configuring one or more SRBs from a wide area BS, wherein the one or more SRBs are used for communication between the UE and the wide area BS via a local area AP. The computer readable program code portion also comprises program code instructions for sending configuration information with respect to the one or more SRBs to the wide area BS for configuring the one or more SRBs between the wide area BS and the UE.

BRIEF DESCRIPTION OF THE DRAWINGS

The embodiments of the present invention that are presented in the sense of examples and their advantages are explained in greater detail below with reference to the accompanying drawings, in which.

DETAILED DESCRIPTION OF EMBODIMENTS

While the making and using of various embodiments of the present invention are discussed in detail below, it should be appreciated that the present invention provides many applicable inventive aspects that can be embodied in a wide variety of specific contexts. The specific embodiments discussed herein are merely illustrative of specific ways to make and use the invention and do not delimit the scope of the invention.

To facilitate the understanding of embodiments of the present invention, a number of terms are defined below. Terms defined herein have meanings as commonly understood by a person of ordinary skill in the areas relevant to the present invention. Terms such as "a," "an" and "the" are not intended to refer to only a singular entity, but include the general class of which a specific example may be used for illustration. The terminology herein is used to describe specific embodiments of the present invention, but their usage does not delimit the invention. For example, a BS in the present invention may refer to one of a NB, an eNB, a base transceiver station, a radio BS, and the like and thus they may be used interchangeably throughout the specification and claims as appropriate.

An LTE-LAN (or LTE-Hi) technique, which is considered as an LTE local area enhancement technique, is proposed to compete with the Wi-Fi technique. The LTE-LAN technique is basically based upon the LTE technology but more focused on certain local area use cases and scenarios. It is expected that the LTE-LAN will provide high performance services for users with low cost.

Figure 1:
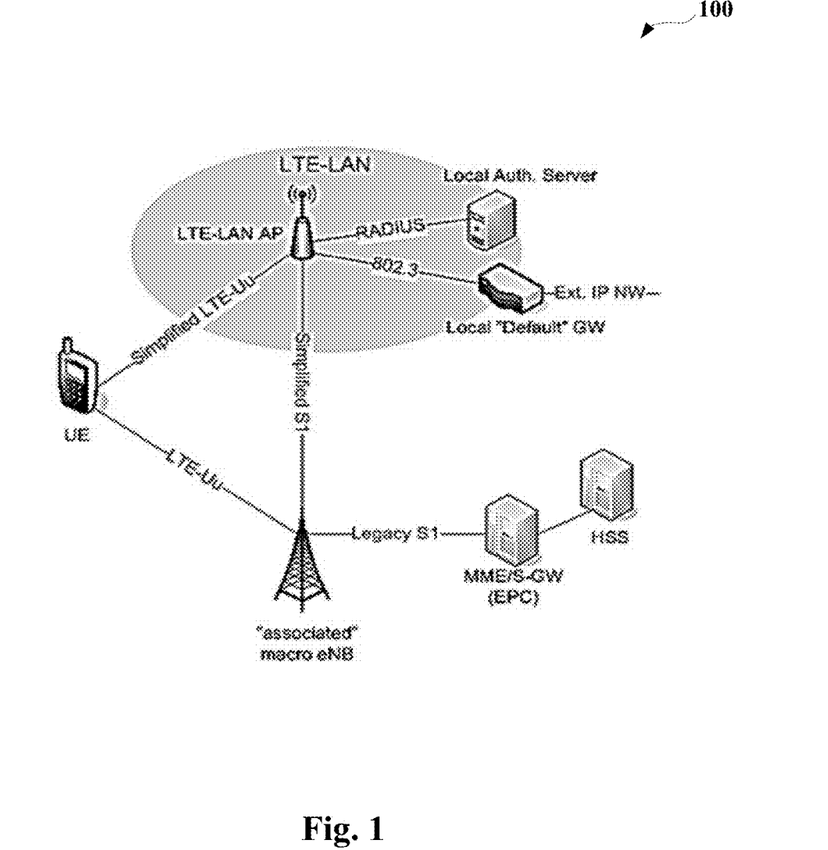
FIG. 1 illustrates an exemplary LTE-LAN network architecture according to embodiments of the present invention.

FIG. 1 illustrates an LTE-LAN network architecture with exemplary network entities and interfaces between these entities. As shown in FIG. 1, the LTE-LAN applies a new LTE-like radio interface as a "simplified LTE-Uu" interface between a UE and an LTE-LAN AP. Due to the requirement of less CN involvement, the LTE-LAN network supports a "stand-alone" mode where the LTE-LAN network is working autonomously by providing a basic wireless broadband access with UE traffic routing to a local LAN/IP network directly from the LTE-LAN AP and to the internet via a default GW of this local LAN/IP network. This autonomous "stand-alone" mode operation is useful especially in the case where overlaying macro network service (also termed a wide area service in the present invention) coverage, e.g., provided by an "associated" macro eNB (also termed a wide area BS in the present invention) as illustrated in FIG. 1, is missing. The local LAN transport network may include an ordinary Ethernet-based LAN, i.e. IEEE 802.3, as shown in FIG. 1. In general, this stand-alone LTE-LAN operation resembles existing Wi-Fi network solutions except that the radio interface is using said simplified LTE-Uu interface.

For the autonomous stand-alone mode operation as discussed above, the LTE-LAN network provides means for UE authentication and authorization to use services provided by the LTE-LAN network. This may be implemented by using similar methods as applied in WLAN (IEEE 802.11i) but modified to carry the authentication protocol messages, e.g. EAP encapsulated into LTE Uu RRC messages. In FIG. 1, there is shown an optional local authentication server that may be a RADIUS server or a diameter server like the one used in enterprise Wi-Fi networks.

The above means might be advantageous since such autonomous (local area) operations to a mobile CN may enable LTE-LAN local access services deployment and operation either by a different mobile operator than the macro eNB, or a local access network operator (third party), where the usage of LTE-LAN network locally supported services may be kept transparent to the CN for simplicity and for lightening signaling load exposed to the CN.

However, a problem may arise during signaling transmissions when the UE is in a single radio mode in which the UE may only communicate with the "associated" macro eNB via the LTE-LAN AP rather than communicating directly with the macro eNB and indirectly therewith via the LTE-LAN AP simultaneously, i.e., in a dual radio mode. Below are discussions with respect to the problem.

In the LTE system (see TS 36.331, chapter 4.2.2, which is incorporated herein by reference in its entirety), there are three types of SRBs between a UE and a macro eNB, i.e., SRB0, SRB1 and SRB2, wherein:

SRB0 is for RRC messages using the CCCH;

SRB1 is for RRC messages (which may include a piggybacked NAS message) as well as for NAS messages prior to the establishment of SRB2, all using the DCCH; and SRB2 is for RRC messages which include logged measurement information as well as for NAS messages, all using the DCCH. SRB2 has a lower priority than SRB1 and is always configured by E-UTRAN after security activation.

Based upon the above specification, the eNB and UE will use different SRBs for different RRC messages based upon the information included therein. For example, when an RRCConnectionRequest message is sent on the CCCH and there is no security concern for this message, the RRCConnectionRequest message would use SRB0 for transmission. Again, when an RRCConnectionReconfiguration message is sent from the eNB to the UE on the DCCH, it is ciphered and integrity protected at a PDCP layer (e.g., one illustrated in FIG. 4) and should use SRB1 for transmission. Additionally, when an ULInformationTransfer message containing NAS PDU(s) is sent on the DCCH and ciphered based upon related NAS layer security keys, it should use SRB2 for transmission.

Figure 4:
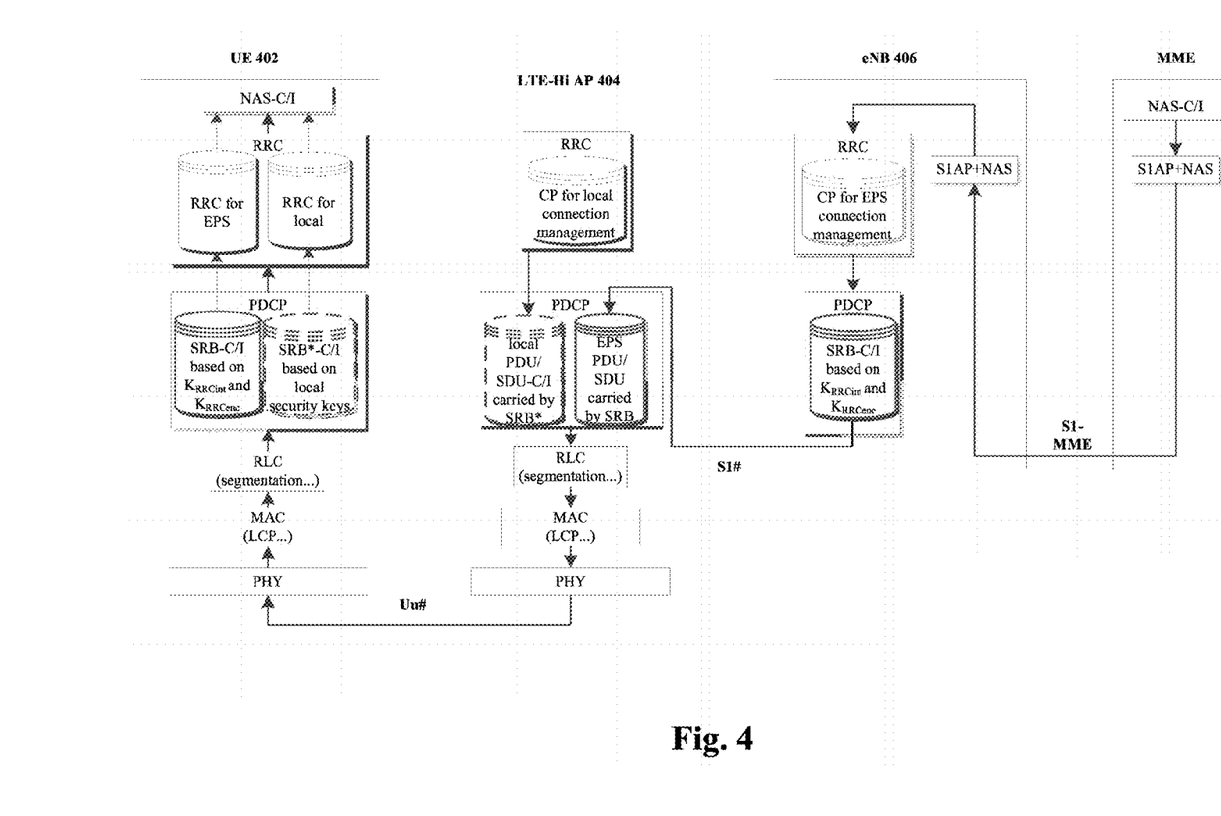
FIG. 4 illustrates an exemplary CP protocol stack in a single radio mode according to which certain embodiments of the present invention may be practiced.

Although the above specification with respect to the use of SRBs may be efficiently applied in the LTE system, it could be inconvenient to the LTE-LAN system when the UE is in the single radio mode as discussed above. In particular, due to potentially independent deployment of the LTE-LAN AP and macro eNB, the LTE-LAN AP cannot properly configure EPS SRBs because it lacks EPS security keys such as $K_{RRCint}$ and $K_{RRCenc}$ as shown in FIG. 4. Therefore, how the associated eNB configures the EPS SRBs over the LTE-LAN network (or via a simplified S1/X2 interface) needs to be solved.

To address the above problem, certain embodiments of the present invention would provide for an efficient way of configuring one or more EPS SRBs over the LTE-LAN AP such that signaling transmissions between the UE and the macro eNB can be performed properly and efficiently. To this end, embodiments of the present invention propose configuring one or more EPS SRBs by taking into account local area RLC/MAC configurations such as logical channel IDs and priority from the LTE-LAN radio interface (i.e., the simplified LTE-Uu interface). In this manner, the macro eNB can efficiently configure the EPS SRBs via lower protocol layers of the LTE-LAN AP such that the EPS RRC messages could be transmitted smoothly between the associated macro eNB and UE via the simplified S1 and LTE-Uu interfaces.

Figure 2:
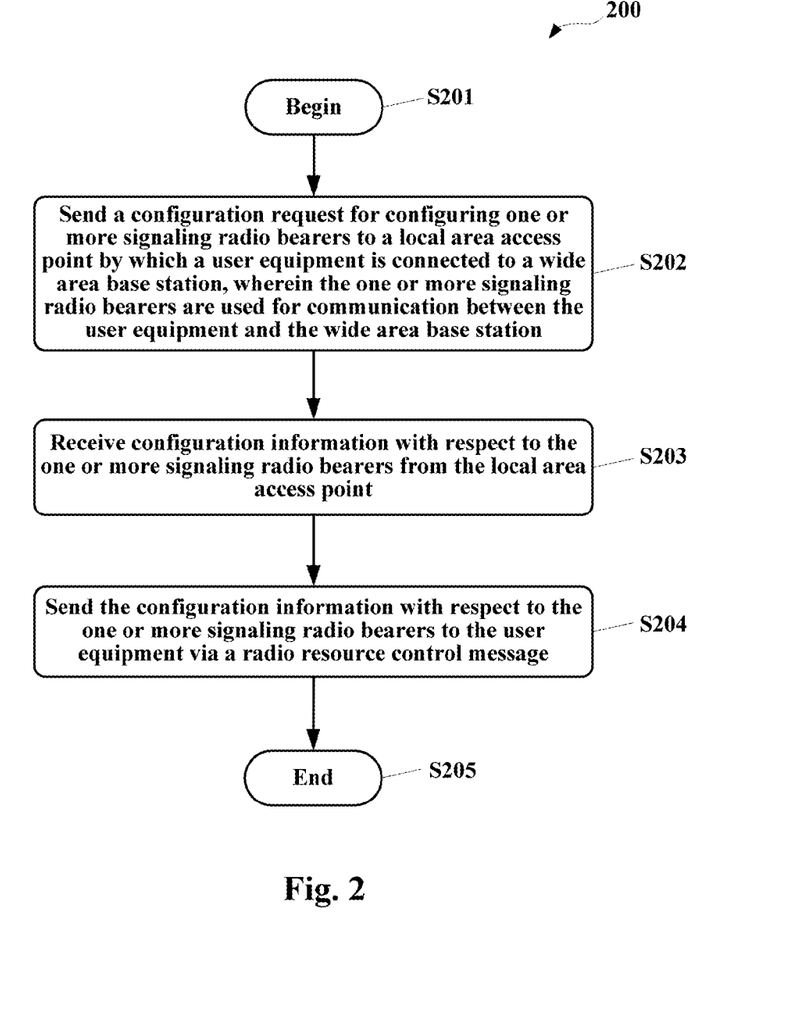
FIG. 2 is a flow chart schematically illustrating a method for configuring one or more SRBs mainly from a BS standpoint according to an embodiment of the present invention.

FIG. 2 is a flow chart schematically illustrating a method 200 for configuring one or more SRBs mainly from a BS (or a macro eNB) standpoint according to an embodiment of the present invention. As illustrated in FIG. 2, the method 200 begins at step S201 and sends, at step S202, a configuration request for configuring one or more SRBs to a local area AP (i.e., an LTE-LAN AP) by which a UE is connected to a wide area BS, wherein the one or more SRBs are used for communication between the UE and the wide area BS. In one embodiment, the configuration request includes configuration information recommended by the wide area BS with respect to the one or more SRBs.

Upon completion of the sending at step S202, the method 200 proceeds to step S203 at which the method 200 receives configuration information with respect to the one or more SRBs from the local area AP. In one embodiment, the configuration information includes RLC layer configuration information and logical channel configuration information with respect to the one or more SRBs. For example, the RLC layer configuration information may include parameters for RLC AM and the logical channel configuration information may include parameters regarding the logical channel priority and prioritized bit rate for logical channel prioritization. For more configuration information, see 3GPP TS 36.331, chapters 6.3.2, which is incorporated herein by reference.

Upon receipt of the configuration information from the local area AP, the method 200, sends, at step S204, the configuration information with respect to the one or more SRBs to the UE via an RRC message.

Finally, the method 200 ends at step S205.

Although not illustrated in FIG. 2, in some embodiments, the method 200 comprises receiving from the UE a response message indicative of successful configuration of the one or more SRBs at the UE. It should be noted that the configuration action as performed in the present disclosure may include establishing and reestablishing an EPS SRB as well as modifying and updating an existing EPS SRB.

According to certain embodiments of the present invention, because the configuration information of the EPS SRB is obtained from the LTE-LAN AP, which has coordinated among all its ongoing RBs and determined usable and appropriate configurations for the requested one or more EPS SRBs, the RRC message can be transmitted between the UE and the wide area BS via the radio interface of the local area AP. Thereby, the UE being connected with the LTE-LAN AP can be served both local IP and offloaded EPS services.

Figure 3:
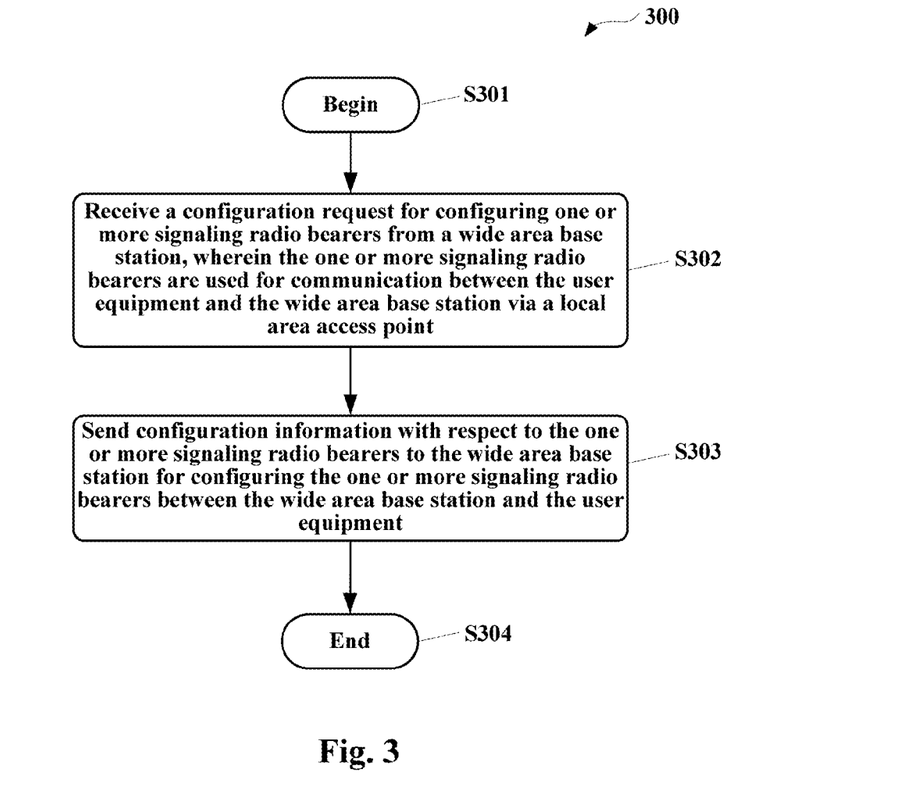
FIG. 3 is a flow chart schematically illustrating another method for configuring one or more SRBs mainly from a LTE-AP standpoint according to an embodiment of the present invention.

FIG. 3 is a flow chart schematically illustrating another method 300 for configuring one or more SRBs mainly from an LTE-AP standpoint according to an embodiment of the present invention. As shown in FIG. 3, the method 300 begins at step S301 and advances to step S302, at which the method 300 receives a configuration request for configuring one or more SRBs from a wide area BS, wherein the one or more SRBs are used for communication between the UE and the wide area BS via a local area AP. Upon receipt of the configuration request from the wide area BS, the method 300 proceeds to step S303, at which the method 300 sends configuration information with respect to the one or more SRBs to the wide area BS for configuring the one or more SRBs between the wide area BS and the UE. Finally, the method 300 ends at step S304.

Although not illustrated in FIG. 3, in some embodiments, the configuration request as mentioned above includes recommended configuration information with respect to the one or more SRBs and the method 300 further determines the configuration information with respect to the one or more SRBs based upon configuration information with respect to all the RBs at the local area AP and the recommended configuration information. All the RBs as referred to herein may include respective SRBs and DRBs for local and wide areas at the local area AP. Because the configuration information has been discussed above in method 200 in reference to FIG. 2 and can be equally applied to method 300, its description is omitted herein for a simplicity purpose.

FIG. 4 illustrates an exemplary CP protocol stack in a single radio mode according to which certain embodiments of the present invention may be practiced. As shown in FIG. 4, a UE 402 is in communication with an associated eNB 406 via a LTE-Hi AP 404, wherein the eNB 406 may be connected to the MME via an S1-MME interface. Exemplary description of transmissions from the eNB 406 to the UE 402 via the LTE-Hi AP 404 is made hereinafter for illustrative purposes.

Suppose that the eNB 406 sends an RRC message to the LTE-Hi AP 404. The RRC message may first be subject to the ciphering based upon the keys, e.g., $K_{RRCint}$ and $K_{RRCenc}$, at the PDCP entity for EPS functions and then be transmitted to the AP 404 via the simplified S1 interface, denoted as S1#. Then, the RRC message may pass through a RLC layer for e.g., segmentation, a MAC layer for e.g., LCP processing and finally be transmitted from the PHY layer to the UE 402 via a simplified Uu interface, denoted as Uu#. Once the RRC message reaches the UE 402, it may go through the PHY, MAC, and RLC protocol layers, at each of which it would be subject to similar processing performed at the AP 404 in reverse. Then at the PDCP protocol layer, the UE 402 would perform integrity check and de-ciphering on the RRC message based upon the keys $K_{RRCint}$ and $K_{RRCenc}$ which are the same as those applied by the eNB 406. After that, the RRC message may successfully arrive at the RRC entity dedicated for EPS functions for further processing.

As can be seen from FIG. 4, to maintain as much backward compatibility as possible, a single RRC layer has been implemented at the UE 402 with two RRC entities respectively for EPS RRC and local RRC functions. Due to the requirement that local RRC messages should be ciphered by local independent security keys, a local area specific SRB, shown as SRB* and similar to the SRB1, may be needed besides EPS SRB (i.e., SRB1&2). This new SRB* is established between the UE 402 and the LTE-Hi AP 404 and ciphered by local security keys in a lower PDCP entity as illustrated by a cylinder depicted with dashed lines.

In the illustrated protocol stack, the LTE-Hi AP 404 takes care of local RRC functions and the associated eNB 406 is in charge of EPS RRC functions. By virtue of this protocol stack, the lower PDCP/RLC/MAC layers as implemented at the UE 402 and the LAN-Hi AP 404 can properly handle logical channels of all the RBs including SRBs and DRBs, for both local and EPS operations, in terms of different ciphering/integrity protection, logical channel prioritization, etc. For example, an EPS RRC message, which includes configurations of one or more SRBs obtained by the embodiments of the present invention, can be transmitted between the associated eNB 406 and the UE 402 through first the simplified S1 (S1# or termed X3) interface and then the LTE-Hi Uu interface (Uu#).

With respect to the NAS protocol layer, the signaling messages between the UE and the macro LTE network are passed transparently via the LTE-LAN system in a similar manner as e.g., NAS messages are passed from the UE to the MME encapsulated in ciphered NAS containers.

The foregoing has discussed the protocol stack that can be used by the embodiments of the present invention. For a better understanding of embodiments of the present invention, some layers and inside entities to which the embodiments may pertain have been discussed and others may be omitted for avoiding unnecessarily obscuring the spirit and principle of the present invention. Further, although only one-way processing has been illustrated in FIG. 4, it should be understood by those skilled in the art that similar messaging can be carried out in reverse from the UE 402 to the eNB 406 via the AP 404, which is not discussed herein for simplicity.

Figure 5:
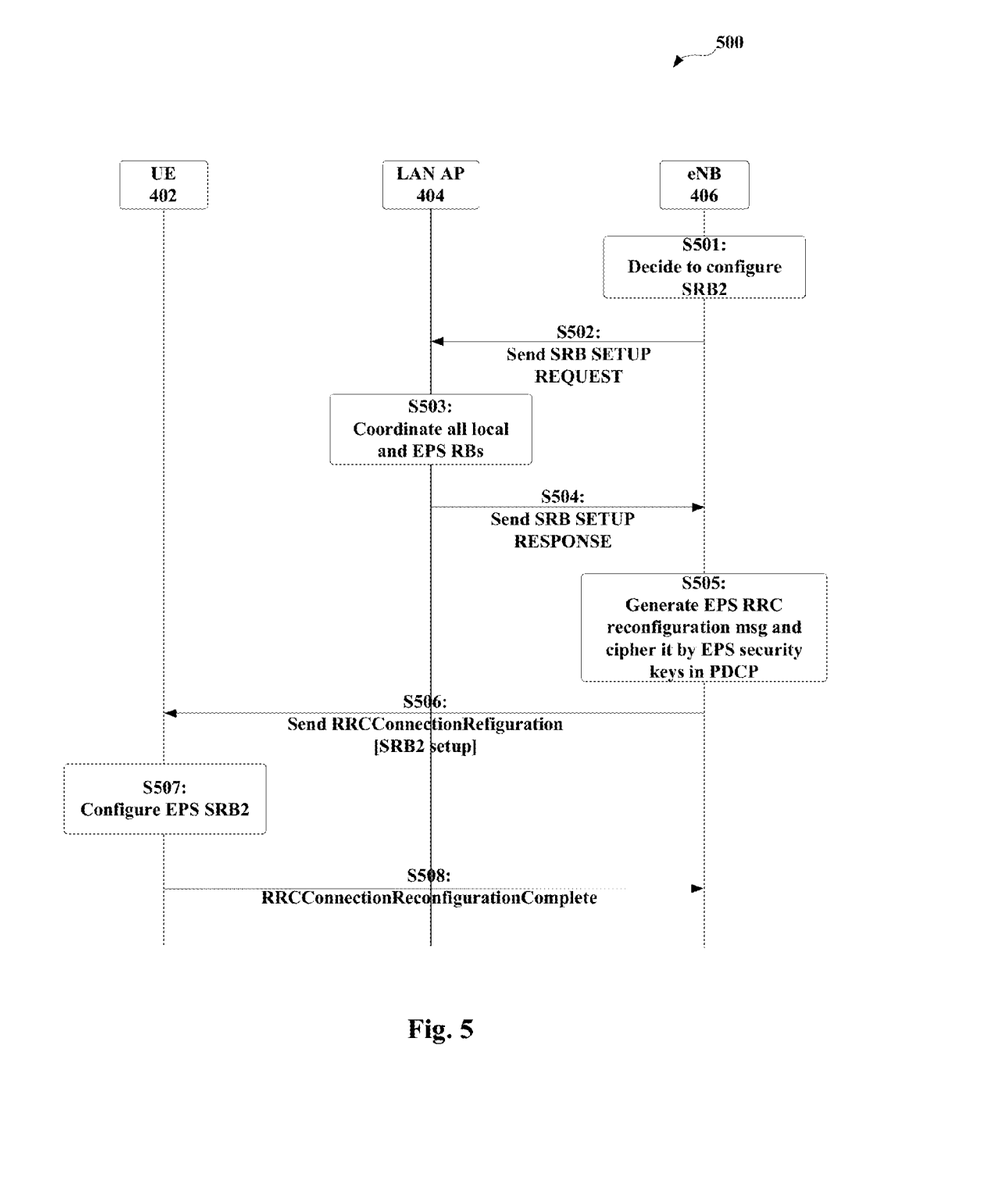
FIG. 5 shows a messaging diagram illustrating exemplary signaling according to an embodiment of the present invention.

FIG. 5 shows a messaging diagram 500 illustrating exemplary signaling according to an embodiment of the present invention. As illustrated in FIG. 5, when the eNB 406 including an EPS RRC entity needs to set up a new SRB, e.g., SRB2, it may decide to configure SRB2 at step S501. Then, it may, at step S502, send a message "SRB SETUP REQUEST" to the LAN-AP 404 via a simplified S1/X3 interface. As discussed before, this message may additionally or optionally include recommend configurations of the SRB2, such as expected configurations of the RLC and logical channels. Upon receipt of the above configuration request message, the LAN AP 404 would coordinate among all its ongoing RBs (including both local and EPS RBs) and determine the feasible configurations for the SRB2, for example, practical RLC and logical channel configurations. Upon completion of the coordination, at step S504, the LAN AP 404 replies to the associated eNB 406 by sending a message "SRB SETUP RESPONSE" in which the determined configurations for the SRB2 have been encapsulated.

Upon receiving the response message, the eNB 406, at step S505, will encapsulate the configurations of the SRB2 received from the AP 404 into the EPS RRC connection reconfiguration message and cipher the resulting RRC PDU using EPS security keys in the lower PDCP layer, as illustrated in the protocol stack in FIG. 4. After that, at step S506, the resulting RRCConnectionRefiguration message including the configuration information is transmitted from the eNB 406 and it proceeds with the direction as shown in the protocol stack in FIG. 4 and finally arrives at the UE 402. Upon receipt of the message "RRCConnectionRefiguration," the UE 402 is able to configure the SRB2 on the basis of the configuration information included in the message. Afterwards, as a response to the message "RRCConnectionRefiguration," the UE 402 may send the message "RRCConnectionReconfigurationComplete" to the eNB 406 at step S508. In this manner, a new SRB can be configured and used between the UE 402 and the eNB 406.

It should be noted that the above-discussed procedure is only of illustrative and may also be applicable to the EPS SRB modification or release procedure. In that case, corresponding messages at steps S502 and S504 may be replaced with "SRB MODIFY/RELEASE REQUEST" and "SRB MODIFY/RELEASE RESPONSE" messages, respectively. In addition, because the EPS RRC messaging between the UE 402 and eNB 406 via the LTE-Hi AP 404 does not involve the RRC layer of the AP 404 due to a separate EPS PDCP entity, sending the RRCConnectionReconfiguration and RRCConnectionReconfigurationComplete messages is not illustrated as being forwarded or relayed by the LTE-Hi AP 404.

As can be seen from the above, configuring EPS SRBs over the LTE-LAN by the messaging 500 may not only ensure secure configurations under the EPS security mechanism but also enable the LAN AP 404 to well coordinate the EPS SRB's configuration parameters with those for local area specific RBs.

It should be noted herein that the steps and execution order as illustrated FIG. 5 are only examples and are not restrictive to the present invention. Those skilled in the art, after reading the present specification, can change these steps, for example, by omitting, combining, or adding certain steps, changing the execution order of certain steps so as to adapt to different application demands.

Figure 6:
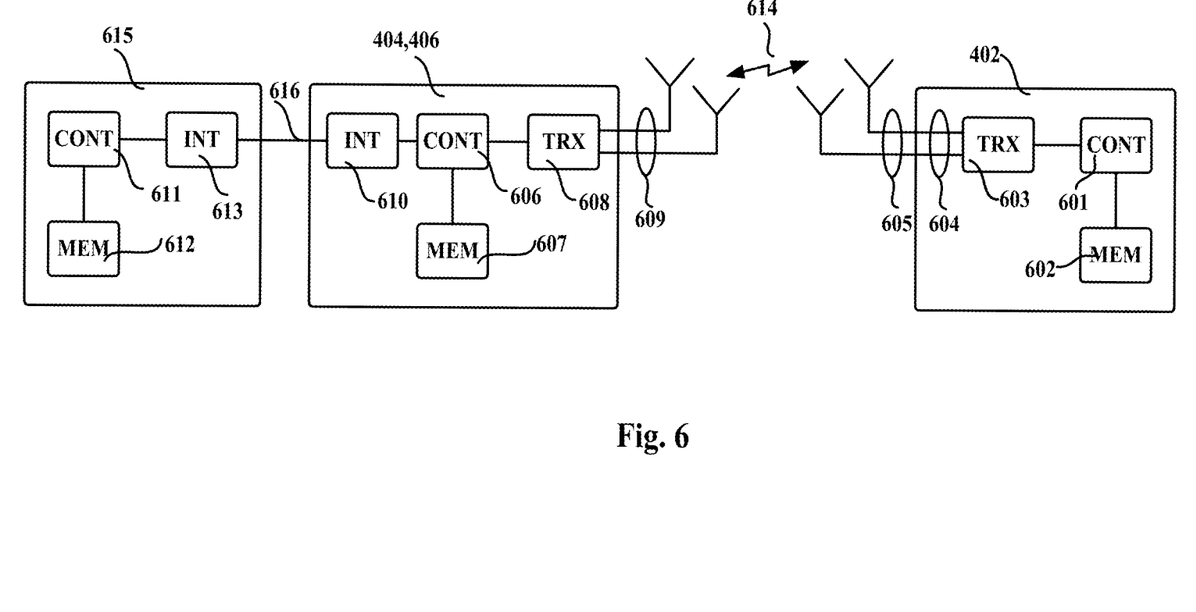
FIG. 6 is a simplified schematic block diagram illustrating apparatuses according to embodiments of the present invention.

FIG. 6 is a simplified schematic block diagram illustrating apparatuses according to embodiments of the present invention. As illustrated in FIG. 6, the UE 402 is located in the area of a radio network node 404 or 406 and is configured to be in connection with the radio network node 404 or 406. The UE 402 comprises a controller 601 operationally connected to a memory 602 and a transceiver 603. The controller 601 controls the operation of the UE 402. The memory 602 is configured to store software and data. The transceiver 603 is configured to set up and maintain a wireless connection 614 to the radio network node 404 or 406. The transceiver is operationally connected to a set of antenna ports 604 connected to an antenna arrangement 605. The antenna arrangement 605 may comprise a set of antennas. The number of antennas may be one to four, for example. The number of antennas is not limited to any particular number. The UE 402 may also comprise various other components, such as a user interface, camera, and media player. They are not displayed in FIG. 6 for simplicity.

The radio network node 404 or 406, such as an LTE BS (or eNB) 406 or LTE-LAN (or LAN-Hi) AP 404, comprises a controller 606 operationally connected to a memory 607, and a transceiver 608. The controller 606 controls the operation of the radio network node 404 or 406. The memory 607 is configured to store software and data. The transceiver 608 is configured to set up and maintain a wireless connection to the UE 402 within the service area of the radio network node 404 or 406. The transceiver 608 is operationally connected to an antenna arrangement 609. The antenna arrangement 609 may comprise a set of antennas. The number of antennas may be two to four, for example. The number of antennas is not limited to any particular number. The radio network node 404 or 406 may be operationally connected (directly or indirectly) to another CN or LAN network element 615 of the communication system, such as a radio network controller (RNC), an MME, an MSC server (MSS), an MSC, an RRM node, a gateway GPRS support node, an OAM node, an HLR, a VLR, a serving GPRS support node, a GW, and/or a server, via an interface 610. The network node 615 comprises a controller 611 operationally connected to a memory 612, and an interface 613. The controller 611 controls the operation of the network node 615. The memory 612 is configured to store software and data. The interface 613 is configured to connect to the radio network node 404 or 406 via a connection 616. The embodiments are not, however, restricted to the network given above as an example, but a person skilled in the art may apply the solution to other communication networks provided with the necessary properties. For example, the connections between different network elements may be realized with IP connections.

Although the apparatus 402, 404, 406, or 615 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 402, 404, 406, or 615 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 602, 607, or 612 may include volatile and/or non-volatile memory and typically stores content, data, or the like. For example, the memory 602, 607, or 612 may store computer program code such as software applications (for example for the detector unit and/or for the adjuster unit) or operating systems, information, data, content, or the like for a processor to perform steps associated with operation of the apparatus 402, 404, or 406 in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
    sending a configuration request for configuring one or more signaling radio bearers to a local area access point by which a user equipment is connected to a wide area base station, wherein the one or more signaling radio bearers are used for communication between the user equipment and the wide area base station;
    receiving configuration information with respect to the one or more signaling radio bearers from the local area access point; and
    sending the configuration information with respect to the one or more signaling radio bearers to the user equipment via a radio resource control message.

2. The method as recited in claim 1, wherein the configuration request includes configuration information recommended by the wide area base station with respect to the one or more signaling radio bearers.

3. The method as recited in claim 1, wherein the configuration information includes radio link control layer configuration information and logical channel configuration information with respect to the one or more signaling radio bearers.

4. The method as recited in claim 1, further comprising:
    receiving from the user equipment a response message indicative of successful configuration of the one or more signaling radio bearers at the user equipment.

5. The method as recited in claim 1, wherein the method further comprises receiving a response message with respect to the one or more signaling radio bearers to the user equipment via the radio resource control message, wherein the response message comprises the configuration information of the one or more signaling radio bearers received from the local area access point.

6. The method as recited in claim 1, wherein the method further comprises
    encrypting the radio resource control message with a security key.

7. The method as recited in claim 1, wherein the method further comprises
    reconfiguring the one or more signaling radio bearers that can be used between the user equipment and an evolved Node B.

8. An apparatus, comprising:
    at least one processor; and
    at least one memory including compute program instructions,
    wherein the at least one memory and computer program instructions are configured to, with the at least one processor, cause the apparatus at least to:
    send a configuration request for configuring one or more signaling radio bearers to a local area access point by which a user equipment is connected to the apparatus, wherein the one or more signaling radio bearers are used for communication between the user equipment and the apparatus, wherein the configuration request includes configuration information recommended by the apparatus with respect to the one or more signaling radio bearers;
    receive configuration information with respect to the one or more signaling radio bearers from the local area access point; and
    send the configuration information with respect to the one or more signaling radio bearers to the user equipment via a radio resource control message.

9. The apparatus as recited in claim 8, wherein the configuration information includes radio link control layer configuration information and logical channel configuration information with respect to the one or more signaling radio bearers.

10. The apparatus as recited in claim 8, further configured to:
    receive from the user equipment a response message indicative of successful configuration of the one or more signaling radio bearers at the user equipment.

11. The apparatus as recited in claim 8, further configured to:
    receive a response message with respect to the one or more signaling radio bearers to the user equipment via the radio resource control message, wherein the response message comprises the configuration information of the one or more signaling radio bearers received from the local area access point.

12. The apparatus as recited in claim 8, further configured to:
    encrypt the radio resource control message with a security key.

13. The apparatus as recited in claim 8, further configured to:
    reconfigure the one or more signaling radio bearers that can be used between the user equipment and an evolved Node B.

14. An apparatus, comprising:
    at least one processor; and
    at least one memory including compute program instructions,
    wherein the at least one memory and computer program instructions are configured to, with the at least one processor, cause the apparatus at least to:
    receive a configuration request for configuring one or more signaling radio bearers from a wide area base station, wherein the one or more signaling radio bearers are used for communication between the user equipment and the wide area base station via the apparatus; and
    send configuration information with respect to the one or more signaling radio bearers to the wide area base station for configuring the one or more signaling radio bearers between the wide area base station and the user equipment.

15. The apparatus as recited in claim 14, wherein the configuration request includes recommended configuration information with respect to the one or more signaling radio bearers and the apparatus further configured to:
    determine the configuration information with respect to the one or more signaling radio bearers based upon configuration information with respect to all the radio bearers at the apparatus and the recommended configuration information.

16. The apparatus as recited in claim 14, further configured to:
    receive a response message with respect to the one or more signaling radio bearers to the user equipment via the radio resource control message, wherein the response message comprises the configuration information of the one or more signaling radio bearers received from the local area access point.

17. The apparatus as recited in claim 14, further configured to:
   encrypt the radio resource control message with a security key.

18. The apparatus as recited in claim 14, further configured to:
   reconfigure the one or more signaling radio bearers that can be used between the user equipment and an evolved Node B.

* * * * *